United States Patent
Bodnar

(10) Patent No.: US 6,686,931 B1
(45) Date of Patent: *Feb. 3, 2004

(54) GRAPHICAL PASSWORD METHODOLOGY FOR A MICROPROCESSOR DEVICE ACCEPTING NON-ALPHANUMERIC USER INPUT

(75) Inventor: Eric O. Bodnar, Capitola, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,618

(22) Filed: Aug. 20, 2001

Related U.S. Application Data

(60) Continuation of application No. 09/453,609, filed on Dec. 3, 1999, now Pat. No. 6,278,453, which is a division of application No. 08/905,463, filed on Aug. 4, 1997.
(60) Provisional application No. 60/049,621, filed on Jun. 13, 1997.

(51) Int. Cl.[7] .................................................. G09G 5/00
(52) U.S. Cl. ........................ 345/741; 345/835; 345/864; 713/202
(58) Field of Search ................................ 345/741–743, 345/764, 775, 780, 781, 808–810, 835, 840, 853, 854, 864, 160; 707/1, 6, 9; 713/202

(56) References Cited

U.S. PATENT DOCUMENTS

| | | | | |
|---|---|---|---|---|
| 4,806,745 A | | 2/1989 | Oogita ........................ 235/492 |
| 5,097,506 A | | 3/1992 | Kaiser, Jr. et al. ........... 713/202 |
| 5,173,940 A | | 12/1992 | Lantz et al. ................. 713/202 |
| 5,251,125 A | | 10/1993 | Karnowski et al. ............ 700/84 |
| 5,276,314 A | | 1/1994 | Martino et al. ............. 340/5.27 |
| 5,550,968 A | | 8/1996 | Miller et al. ................. 345/741 |
| 5,559,961 A | | 9/1996 | Blonder ....................... 713/202 |
| 5,774,540 A | | 6/1998 | Davidson et al. ........... 379/396 |
| 5,821,933 A | | 10/1998 | Keller et al. ................. 345/741 |
| 6,209,104 B1 | * | 3/2001 | Jalili ........................... 340/5.8 |
| 6,278,453 B1 | * | 8/2001 | Bodnar ....................... 345/764 |
| 2003/0070091 A1 | * | 4/2003 | Loveland .................... 713/201 |
| 2003/0177349 A1 | * | 9/2003 | Hersh ......................... 713/155 |

OTHER PUBLICATIONS

McCarthy, Shawn P., "Networking Break-ins Reveal the Chinks in Systems Security", Government Computer News, vol. 13, No. 17, Aug. 8, 1994, p. 63(2).*

* cited by examiner

Primary Examiner—Sy D. Luu
(74) Attorney, Agent, or Firm—Hisashi D. Watanabe

(57) ABSTRACT

A portable computing device or "information appliance" having terse user input (e.g., limit set of keys) is provided with a user interface for navigating user data. Application programs, which are provided for user operation of the device, are implemented as separate modules controlled by a module selector. The module selector serves as a user interface or shell representing the top-level or "home" display presented to a user. The module selector presents the user with selection icons for navigating to different applications or modules of functionality. The user interface implements a "single-click" style of button operation, so that users can associate each button with a particular task for a given program context. In addition to the single-click style, "click consistency" is imposed for each button. Generally, the same buttons are used over and over again to perform their respective tasks, even though the user has navigated to different modules of an application, so that the user is presented with a consistent interface or metaphor which can be easily mastered. The user interface supports in a small form factor device the browser-style navigation that users have become accustomed to on desktop computers (e.g., using Web browsers). More particularly, the interface supports up, down, forward, and backward navigation for allowing a user to "drill down" to "drill across" his or her data. This allows the user to find a data item (link) of interest and then drill down into it. Once at the appropriate level, the user can then easily select the particular item of interest. Further, once the user has selected or entered an item, the system provides the ability for the user to return to "home" with a single button click. In this manner, the present invention provides an interface allowing browser-style navigation in a device having a terse set of input keys.

42 Claims, 18 Drawing Sheets

GRAPHICAL PASSWORD METHODOLOGY FOR A MICROPROCESSOR DEVICE ACCEPTING NON-ALPHANUMERIC USER INPUT

RELATED APPLICATIONS

The present application is a continuation application of and claims the benefit of priority from commonly-owned application Ser. No. 09/453,609, filed Dec. 3, 1999, now U.S. Pat. No. 6,278,453, which in turn is a divisional application of and claims the benefit of priority from commonly-owned application Ser. No. 08/905,463, filed Aug. 4, 1997, now pending, which in turn claims the benefit of priority from commonly-owned provisional application Ser. No. 60/049,621, filed Jun. 13, 1997, entitled USER INTERFACE METHODOLOGY FOR MICROPROCESSOR DEVICE HAVING LIMITED USER INPUT, by inventor Eric O. Bodnar, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Today, there is a growing interest in small or "form factor" smart electronic devices. As a result, software applications which were typically the domain of desktop computers are now expected by users to be available on these small devices—devices which can easily fit in one's pocket or wallet. Although advances have occurred in software design which provide hand-held devices with substantial processing power, memory capacity, and display power, a number of "form factor" related problems nevertheless remain to be solved.

No matter how high the resolution is of a device's display, for instance, there still remains a finite amount of physical screen "real estate" which can be provided by the device. In the case of small hand-held devices, the amount of this screen real estate or physical screen area is obviously much less than that provided by desktop computers. If this problem is addressed by displaying items on screen at a smaller size, users have difficulty reading the information. Although virtual screen technology is available for users to "pan" across a larger virtual screen, the additional user input required to manage the process makes the approach undesirable. Information which cannot be seen is of no value to users.

Another problem facing small electronic devices is the difficulty of inputting information. With a small form factor or pocket-size device, it is simply not feasible to include a substantial keyboard for inputting information. Again, the size of the devices reduces the physical surface area available for accommodating input keys or the like. A conventional approach to the problem is to simply build a smaller keyboard, one using miniature input keys. The approach is problematic. In particular, most users find that their fingers are simply too big to use small keys with any degree of efficiency. Further, any efforts to increase the size of a keyboard or keypad in such a device reduces the amount of surface area available for the display screen.

An approach to this problem is to simply let the display screen double as an input device. The basic problem remains unsolved, however. Any display surface area allotted to display screen buttons decreases the amount available for displaying program information, such as output screens. Further, displaying different sets of keys during the operation of a program increases the complexity and, therefore, the learning curve for that program.

A similar approach to the above is handwriting recognition, such as available with Apple's Newton device. With the current state of handwriting technology, however, the process is both processor intensive (and therefore slow) and error prone. These two disadvantages have combined to make present-day handwriting recognition unattractive to all but the most patient of users. Even with shorthand or gesture-based handwriting recognition, success of those devices remains limited, as most users are unwilling to spend the time mastering gesture strokes.

Again, the physical limitations imposed by these devices remains a problem. For handwriting recognition, for instance, the screen devices must be coated with a special material for receiving stroke input. That material adds yet another layer on top of the display screen thus making the screen more difficult to read (since screen contrast of an already small screen is decreased even further). All told, present-day handwriting recognition is far from an ideal solution.

The problem faced by designers of small "form factor" devices is certainly not limited to input and display of information. For instance, a whole set of design problems exist concerning power management—that is; optimizing a device's use of a limited power source, such as batteries. All told, the small size of pocket-size devices imposes a physical limitation impacting all the subsystems of such a device.

What is needed is improved user input and usability methodology for small form factor devices. Such a methodology should not require sophisticated hardware support, such as handwriting recognition. Further, such methodology should accommodate a limited or terse set of input keys or buttons (e.g., five keys) as well as limited display surface area typically provided by small form factor devices. Such methodology should nevertheless accommodate large character sets, such as ones including a full range of alphabetic and numeric characters. The present invention fulfills this and other needs.

SUMMARY OF THE INVENTION

A portable computing device or "information appliance" having terse user input (e.g., limit set of keys) is provided with a user interface for navigating user data. The computing device comprises a central processing unit (e.g., microprocessor) connected via a system bus to a display, an input, ports, and memory. Display is a screen device for displaying information, such as a liquid crystal display (LCD) screen. Input comprises a keypad, either physical or logical (e.g., on screen buttons), but limited to a terse set numbering about three to ten buttons and more preferably about five buttons. Memory comprises persistent memory, volatile memory, and non-volatile RAM memory. Persistent memory is typically implemented as a ROM or read-only memory. It stores a single-purpose operating system (SPOS) and application(s). Volatile memory is a "scratch" memory, for storing temporary computation results. It typically is implemented as a RAM (random-access memory), for providing a work space for the operating system and applications. Non-volatile RAM memory represents battery-backed RAM memory, for storing context information from one session to another. When the device is powered down the memory stores user data from that session.

The single purpose operating system (SPOS) functions to provide a consistent mechanism by which applications can communicate with the device. In this manner, applications are shielded from hardware complexity, such as hardware interrupts and ports. In other words, it serves to abstract hardware complexity to a high-level application programming interface (API).

Applications are software application programs or modules provided for user operation of the device. The application programs can be implemented as separate modules, which are controlled by a module selector. The module selector serves as a user interface or shell representing the top-level or "home" display presented to a user. In the currently-preferred embodiment, the module selector presents the user with selection icons for navigating to different applications or modules of functionality. In an exemplary embodiment, for instance, other modules include a calendar module, a to do module, and an address book module.

In typical use, the device is used in tandem with a desktop computer or PC.

The desktop PC is used by the user when "at the office," and the portable computing device is employed when the user is "on the road" (i.e., out of the office). Thus during typical use, large repositories of data reside on the desktop PC which are periodically transferred or synchronized with data residing on the portable computing device. Multiple techniques exist for getting data from the desktop PC to the portable computing device, through device port(s). Using a device input/output (I/O) protocol or standard, such as the PC card standard (formerly PCMCIA standard), the user can easily transfer data to the device via a direct memory transfer. Alternatively, data can be streamed from the desktop PC to the portable computing device via a direct cable (or infrared) connections such as using a serial port-to-serial port connection. Since the data transferred is that of an application operating on the desktop PC, potentially thousands of data items or records might be downloaded into the portable computing device. This potentially large dataset, coupled with the terse key set available at the portable computing device, poses a challenge to the location of desired information by a user. Therefore, improved user interface methodology is needed.

In the most-preferred embodiment, the present invention provides a user interface implementing a "single-click" style of button operation, so that users can associate each button with a particular task for a given program context. In addition to the single-click style, the preferred embodiment imposes "click consistency" for each button. Generally, the same buttons are used over and over again to perform their respective tasks, even though the user has navigated to different modules of an application. In this manner, the user is presented with a consistent interface or metaphor which can be easily mastered.

Also in the preferred embodiment, the user interface supports in a small form factor device the browser-style navigation that users have become accustomed to on desktop computers (e.g., using Web browsers). More particularly, the interface supports up, down, forward, and backward (reverse) navigation for allowing a user to "drill down" to "drill across" his or her data. This allows the user to find a data item (link) of interest and then drill down into it. Once at the appropriate level, the user can then easily select the particular item of interest. Further, once the user has selected or entered an item, the system provides the ability for the user to return to "home" with a single button click. In this manner, the present invention provides an interface allowing browser-style navigation in a device having a terse set of input keys.

A method for providing users with access to applications and user information in a computing device having a limited set of input keys may be summarized by the following method steps. At the outset, the device displays a user interface having a top level view for allowing a user to select among applications available for the computing device. User interface navigation is provided in response to user operation of the limited set of input keys. In response to user selection of a forward key from said limited set of input keys, the device moves a screen cursor in a forward relative direction among screen objects at a given level. In response to user selection of a reverse key from said limited set of input keys, the device moves the screen cursor in a reverse relative direction among screen objects at a given level. In response to user selection of a select key from said limited set of input keys, the device selects a particular screen object at which the screen cursor is currently located, whereupon the device displays a lower level view of the user interface which pertains to the particular screen object. In response to user selection of a home key from said limited set of input keys, the device returns to the top level view. In this manner, access to the applications and user information is achieved for the computing device through use of said limited set of input keys.

Additionally, a device having a terse set of input keys provides password protection as follows. The interface implements a "graphical password" which can be entered directly from the terse set of keys. Instead of a conventional alphabetic password as conventionally found on computing devices, the graphical password comprises a sequence of non-alphabetic keystrokes from the terse set. Here, an exemplary graphical password might comprise, for example, FORWARD, FORWARD, BACK, BACK, SELECT, or, alternatively, the user could select HOME, SELECT, FORWARD, HOME, HOME, BACK.

During device operation, upon the user entering a graphical password, the device displays a password entry screen. When the device is configured for password protection, the screen appears each time the device is powered up. To gain access to information on the device, the user must at this point enter the same sequence of key strokes as that which comprises the user's graphical password. In an exemplary embodiment, a password mask field indicates entries of each key stroke, but with the actual keys themselves being masked.

A method for controlling access to a computing device having a limited set of input keys (particularly, a set of input keys including non-alphanumeric keys) may, therefore, be summarized as follows. At the outset, the device records a user-provided sequence of key strokes entered from the non-alphanumeric keys. The device stores the recorded sequence of key strokes as a "graphical password"—that is, a password comprising non-alphanumeric key strokes. Upon request from a user for access to the computing device, the device prompts the user to enter the graphical password. If the user enters a sequence of key strokes which matches that of the sequence of key strokes stored as the graphical password, the device grants device access to the user.

Additional methodology is provided for dynamically adjusting tab categories and subcategories. The method is, in the preferred embodiment driven in part by the number of lines supported by the display. In the foregoing example, for instance, the interface supports seven displayable lines which the user can navigate. The number of displayable lines is employed to set a threshold number of items which must exist before creating further tab categories (i.e., subcategories). In the currently-preferred embodiment, the number is set equal to the number of displayable lines plus 1 (e.g., the number 8, for a display having 7 displayable lines). Any three-letter category which qualifies for subcategory tabs is determined by eight or greater items which satisfy that key. For clarity of the interface, the method adopted always creates a boundary tab—that is, a category tab for the starting index after the subcategory set. In the example presented above, the next tab category created is "Mo" (instead of the tab category "N"), even though the number of "Mo" entries might be less than the threshold value. By the same token, the methodology ignores combinations which do not exist in the user data. If no "J" items exist, for example, then a "J" tab is not created. Using the foregoing method, the system provides the user with a "find" operation based, not on a linear search, but on dynamically-created categories.

A method for providing access to a data set which stores information in data records having data fields may, therefore, be summarized as follows. An initial order for displaying the data set based on values of a particular data field is established. Commonly, this will be an alphabetic sort order, such as a descending sort by Last Name. The data set is displayed according to this established order. To facilitate navigation, the device displays category tabs for navigating among individual data records of the data set. This entails the following. The device determines dynamically, based on actual values stored at the particular data field of the data records, categories of information available for the particular data field. Based on this determination, the device displays a tab identifier allowing navigation to a particular category if at least one data item exists for the particular category. In this manner, at least some tab identifiers are eliminated from display—particularly, tab identifiers are eliminated for those categories of information which currently have no data items. The result is much faster and efficient navigation through large datasets when using a terse or limited key set.

DETAILED DESCRIPTION OF A PREFERRED EMBODIMENT

The following description will focus on the presently-preferred embodiment of the present invention, which is typically operative in end-user application programs and/or operating system programs operating in a portable computing environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

General System

A. Device Hardware

Figure 1:
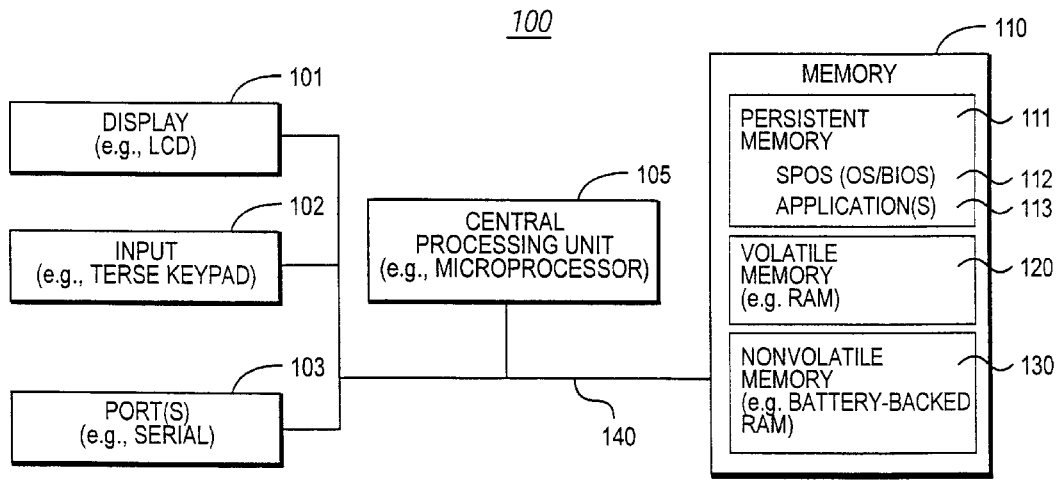
FIG. 1 is a block diagram illustrating the general architecture of a portable computing device or "information appliance" in which the present invention may be embodied.

FIG. 1 is a block diagram illustrating the general architecture of a portable computing device or "information appliance" in which the present invention may be embodied. As shown, computing device 100 comprises a central processing unit 105 (e.g., microprocessor) connected via a system bus 140 to a display 101, an input 102, ports 103, and memory 110. Display 101 is a screen device for displaying information, such as a liquid crystal display (LCD) screen. Input 102 comprises a keypad, either physical or logical (e.g., on screen buttons), but limited to a terse set numbering about three to ten buttons and more preferably about five buttons. Memory 110 comprises persistent memory 111, volatile memory 120, and non-volatile RAM memory 130. Persistent memory 111 is typically implemented as a ROM or read-only memory. As shown, it stores a single-purpose operating system (SPOS) 112 and application(s) 113, which are described in further detail below. Volatile memory 120 is a "scratch" memory, for storing temporary computation results. It typically is implemented as a RAM (random-access memory), for providing a work space for the operating system and applications. Non-volatile RAM memory 130 represents battery-backed RAM memory, for storing context information from one session to another. When the device 100 is powered down the memory 130 stores user data from that session.

B. Device Software

The single purpose operating system (SPOS) functions to provide a consistent mechanism by which applications 113 can communicate with the device 100. In this manner applications 113 are shielded from hardware complexity, such as hardware interrupts and ports. In other words, it serves to abstract hardware complexity to a high-level application programming interface (API).

Figure 2:
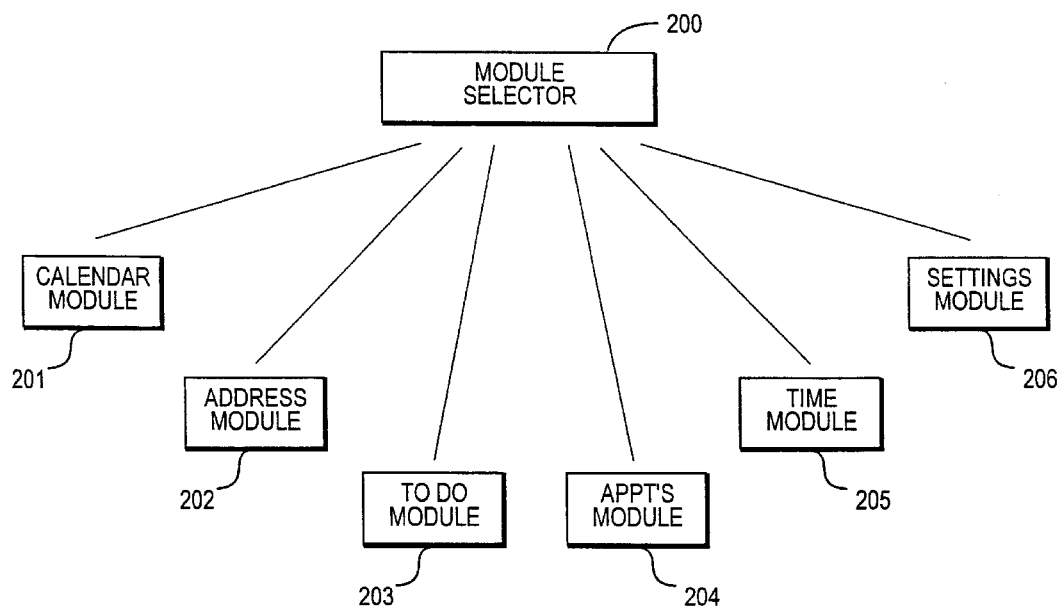
FIG. 2 is a block diagram illustrating implementation of the application programs as modules under the control of a module selector.

Applications 113 are software application programs or modules provided for user operation of the device. As shown in FIG. 2, for instance, the application programs can be implemented as modules 201–206, which are controlled by a module selector 200. The module selector 200 serves as a user interface or shell representing the top-level or "home" display presented to a user. In the currently-preferred embodiment, the module selector 200 presents the user with selection icons for navigating to different applications or modules of functionality. In an exemplary embodiment, for instance, other modules include a calendar module, a to do module, and an address book module.

In typical use, the device 100 is used in tandem with a desktop computer or PC. The desktop PC is used by the user when "at the office," and the portable computing device 100 is employed when the user is "on the road" (i.e., out of the office). Thus during typical use, large repositories of data reside on the desktop PC which are periodically transferred or synchronized with data residing on the portable computing device 100. Multiple techniques exist for getting data from the desktop PC to the portable computing device, through device port(s) 103. Using a device input/output (I/O) protocol or standard, such as the PC card standard (formerly PCMCIA standard), the user can easily transfer data to the device 100 via a direct memory transfer. Alternatively, data can be streamed from the desktop PC to the portable computing device via a direct cable (or infrared) connection, such as using a serial port-to-serial port connection. Since the data transferred is that of an application operating on the desktop PC, potentially thousands of data items or records might be downloaded into the portable computing device 100. This potentially large dataset, coupled with the terse key set available at the portable computing device, poses a challenge to the location of desired information by a user. Therefore, improved user interface methodology is needed.

Improved User Interface

A. General Design

The following description will focus on a preferred user interface and methodology for a form factor device having a terse set of input keys, preferably about five input keys. Those skilled in the art, enabled by the teachings herein will appreciate that the invention can easily be adapted to form factor devices having more or fewer input keys. Hence, the description which follows is for purposes for illustration and not limitation.

In the most-preferred embodiment, the user interface of the present invention implements a "single-click" style of button operation. Given a device with five input buttons, for instance, various key combinations beyond the simple clicking of each individual button could be created. Buttons could, for example, be "double clicked" by users or combined to create double or triple (or even more) key combinations. Although such an approach yields more logical buttons from the available physical buttons, the approach requires users to memorize key combinations which are not intuitive (and are a source of endless grief for users of such devices). Accordingly, in the most-preferred embodiment, a single-click style is adopted, so that users can associate each button with a particular task for a given program context.

In addition to the single-click style, the preferred embodiment imposes "click consistency" for each button. Generally, the same buttons are used over and over again to perform their respective tasks, even though the user has navigated to different modules of an application. In this manner, the user is presented with a consistent interface or metaphor which can be easily mastered. If, on the other hand, behavior of the button changed from one portion or context of the application to another, the user must relearn the functionality of each button.

Also in the preferred embodiment, the user interface supports in a small form factor device the browser-style navigation that users have become accustomed to on desktop computers (e.g., using Web browsers). More particularly, the interface supports up, down, forward, and backward navigation for allowing a user to "drill down" to "drill across" his or her data. This allows the user to find a data item (link) of interest and then drill down into it. Once at the appropriate level, the user can then easily select the particular item of interest. Further, once the user has selected or entered an item, the system provides the ability for the user to return to "home" with a single button click. As set forth below, the present invention provides an interface allowing browser-style navigation in a device having a terse set of input keys.

B. Navigation Model

The module selector presents an array of icons, each one corresponding to a particular application within the system. At all times, the system displays a highlight on screen for indicating "focus"—that a particular item is the focus of further user input (at that point in time). At the top level or "home," focus is indicated by a highlight around one of the application icons.

Figure 3:
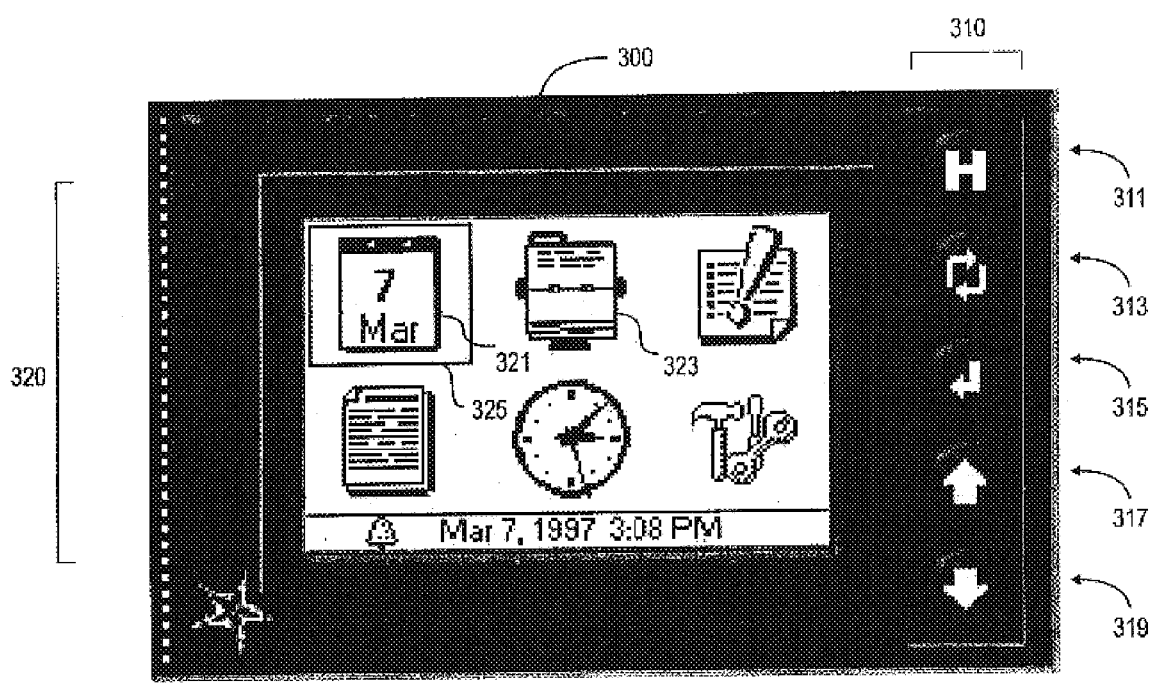
FIG. 3 is a bitmap screen shot illustrating a display interface comprising a plurality of application or module icons, from which the user can invoke particular application functionality.

As shown in FIG. 3 for device 300, for instance, display interface 320 comprises a plurality of application or module icons (e.g., icons 321, 323), from which the user can invoke particular application functionality. As shown, icon 321 currently had "focus," as indicated by focus outline (rectangle) 325. As also shown in FIG. 3, the device 300 includes five buttons 310. These buttons function as follows. Home key 311 provides a browser-like key allowing a user to always return to "home"—that is, a general or overview display screen. For the embodiment illustrated by FIG. 3, "home" is the module selector display or shell shown by display screen 320. In this manner, no matter how far a user has "drilled down" in the interface, the home key 311 will always return the user to the top-level view or shell, with a single button click.

Forward key 319 and backward key 317 allow the user to navigate forward or backward (respectively), within a given level of the interface. For the top-level view shown by display 320, for instance, the forward and backward keys move the selective or highlight from one icon to another, either in a forward or reverse direction depending on which of the two buttons 317, 319 is activated. In the currently-preferred embodiment, a highlight or selector is presented at all levels of the interface, so that the functionality of buttons 317, 319 remains consistent and intuitive. As a result, the user always knows how to shift focus from one item to another regardless of what level of the interface the user has navigated to.

Working in conjunction with the forward/backward buttons 317, 319 that shift focus through a current level, select button 315 invokes (or "selects") the item currently having focus, when the button is activated by the user. At the top-level view shown in at 320, for instance, user activation of select button 315 serves to select the calendar module represented by icon 321. In response to this selection, the system "drills down" into the calendar module.

Using the select key in combination with the forward and backward keys, the user is easily able to navigate up and down interface levels as well as across a particular level. In other words, the buttons provide a navigation model where the user can move from point to point for changing direction within a level, selection itself always indicates the current focus or point of activity (which will occur) within a given level. Selecting that item with the select button 315 causes the system to drill down into the functionality represented by the selected item. Regardless of how many levels the user has drilled down into using this technique, the home button 311 will always return the interface back to the top-level view (e.g., such as the "home" view represented by display 320).

As shown in FIG. 3, buttons 310 include a fifth key or button, view switch button 313. The view switch button 313 allows the user to instruct the system to switch to a different view within a given level, thus providing the user with a different way of viewing the data. Consider, for instance, presentation of calendar data by a calendar module. Calendar or time-related data can be represented or displayed in multiple ways. One way to represent such information, for example, is to display a linear (event-by-event) list. Alternatively, such information could be presented on a week-by-week basis—that is, viewing data over a span of a given week. Yet another way to view such information is a monthly view which highlights dates for a given month which have events (or other user data). The view switch 313, therefore, cycles through different views at a particular level, with the actual views available being dictated by the particular application (module). In order to simplify the interface for the user, the number of views available at a given level should typically not exceed about four views.

C. Navigation Model can be Generically Applied

Figure 4A:
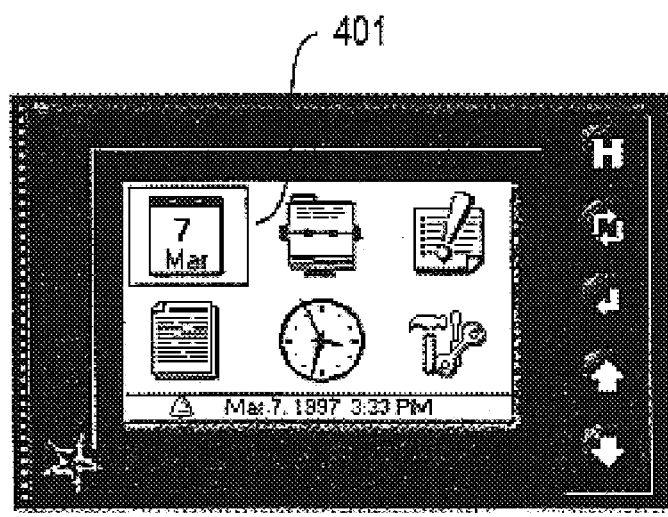
FIGS. 4A–G are bitmap screen shots illustrating use of a high-level navigation model of the present invention applied to a variety of types of user information.
Figure 4B:
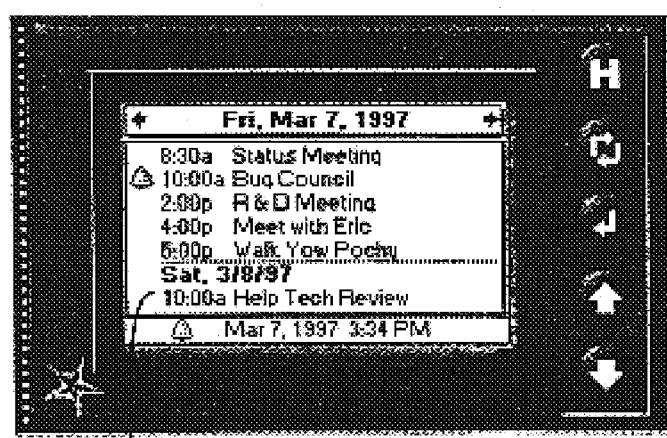
Figure 4C:
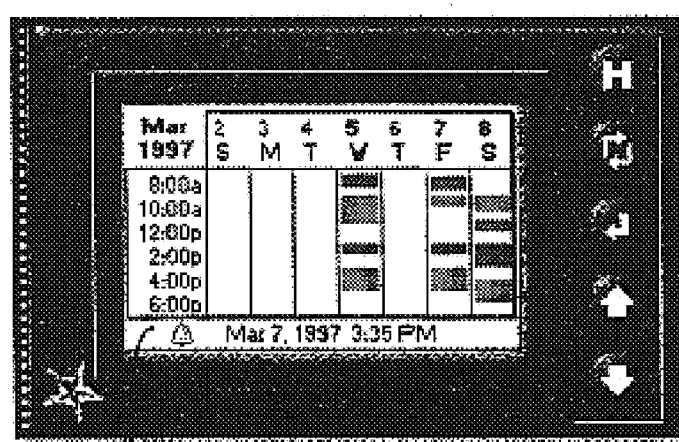
Figure 4D:
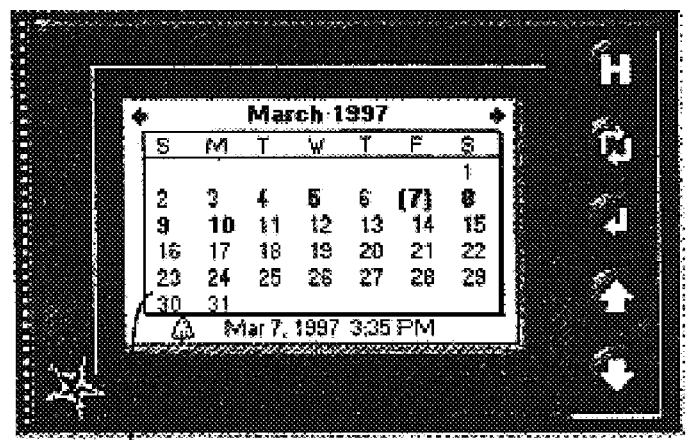
Figure 4E:
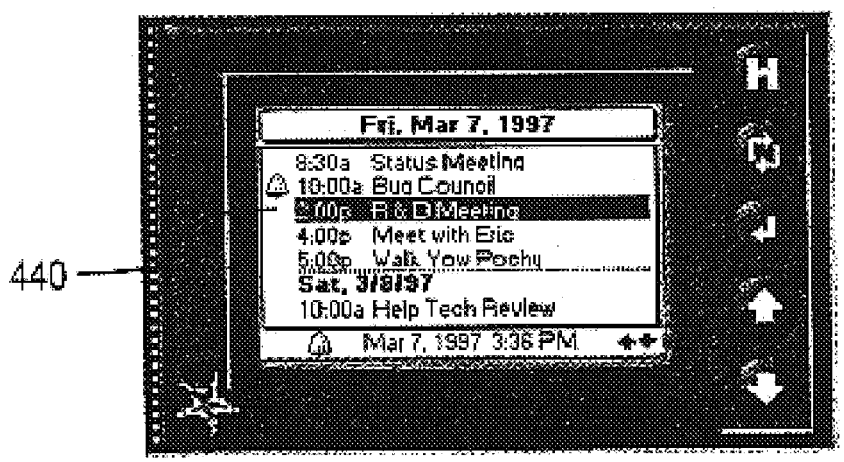
Figure 4F:
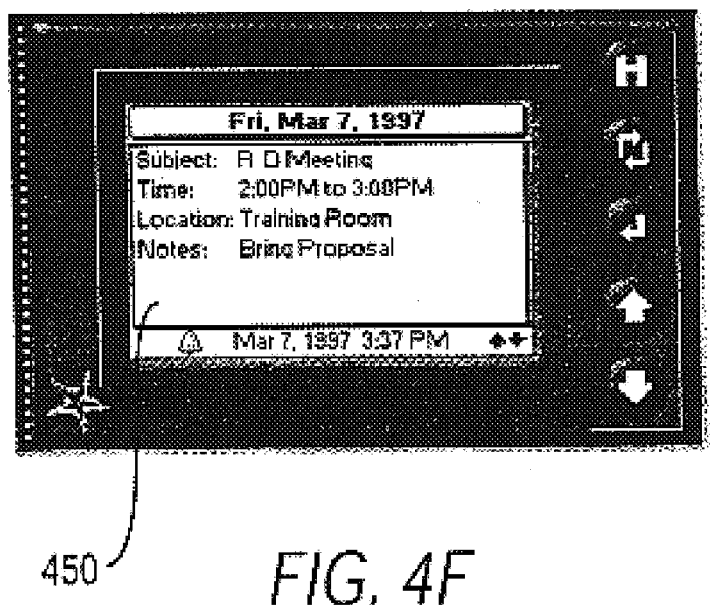
Figure 4G:
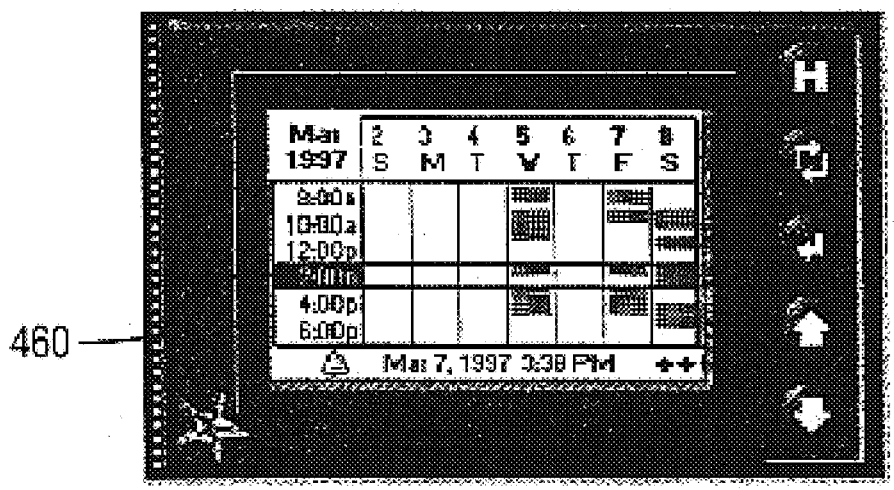

Generally, the high-level navigation model can be applied to other types of user information. This is illustrated in FIGS. 4A–B. In FIG. 4A, the calendar module has focus, as indicated at 401. Upon user activation of the select key, the interface invokes the calendar module, as indicated at 410 in FIG. 4B. By activating the view switch key, the user can switch the display to get another view of the data. For instance, upon the user first invoking the key, the display switches to a weekly view, as indicated at 420 in FIG. 4C. Further activation of the key switches the display to a monthly view, as shown at 430 in FIG. 4D. In any one of these views, the user can select an item and drill down into it. For the present example, this is illustrated by FIGS. 4E–F. In FIG. 4E, the user selects an item, shown at 440, using forward/backward keys. Now that a particular item has focus, the user can drill down into that item, by activating the select key. The result is shown at 450 in FIG. 4F. Here, the system displays the particular record corresponding to the selected item. As illustrated in FIG. 4G, the user can continue navigating using the selection and drill down approach. In FIG. 4G, the user has selected item 460 from the displayed list of items. As before, the user can invoke the select key for displaying further information about the selected item—detailed information for a particular time interval for this example (not shown). The foregoing example illustrates that the navigation module of the present invention can easily be applied to completely different datasets. At the same time, the user is still able to efficiently navigate among items in each dataset even though the device itself only includes a terse set of input keys.

Although the foregoing focus is on the environment of the interface in a portable computing device such as a PDA (personal digital assistant), the interface methodology also has application to a variety of other devices. As enhanced processing power becomes available to more and more devices, including household appliances, there is a growing need for an interface for efficiently controlling such devices. Given the physical limitation of such devices, those devices will continue to have a small set of input keys, instead of larger keypads or handwriting recognition. For an intelligent coffee maker, for example, the physical size of the device makes it undesirable to incorporate a large keypad or a style list for handwriting recognition.

D. Navigation Model Applied to Preference Settings

Figure 5A:
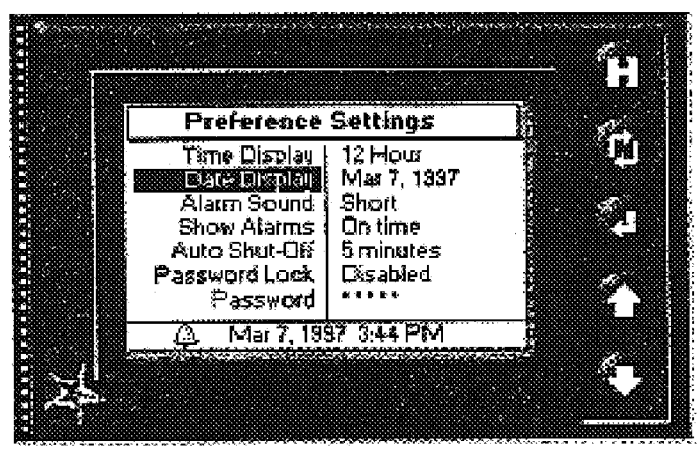
FIGS. 5A–C are bitmap screen shots illustrating use of the navigation model for setting user preferences.
Figure 5B:
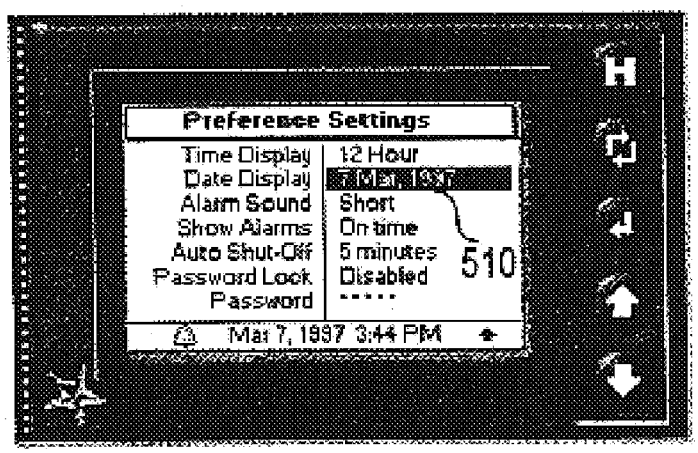
Figure 5C:
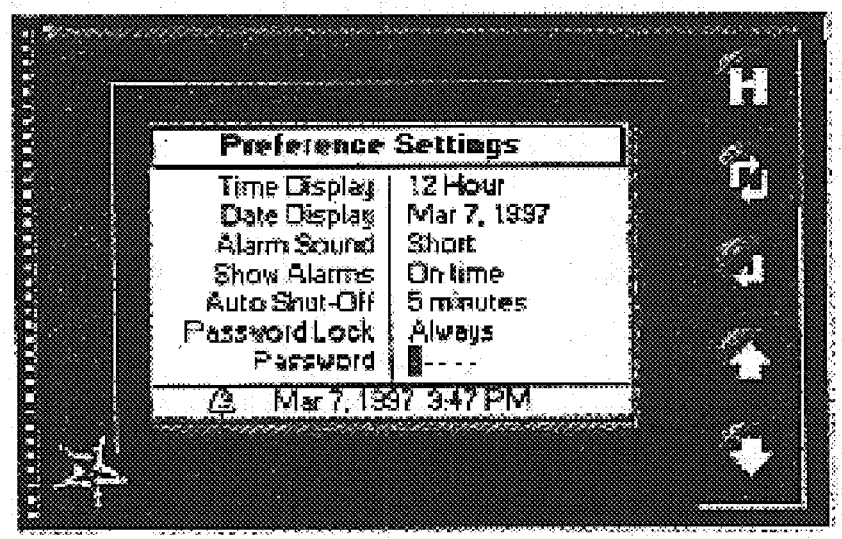

FIGS. 5A–C illustrate use of the navigation model for setting user preferences. The user begins by invoking the preference module from the module selector screen. At the preference setting screen, such as illustrated in FIG. 5A, the user employs the forward and backward keys for navigating to a particular item, such as "date display." Once the user has selected a particular item to change, the user invokes the select key to navigate to the item's value, such as the date display value 510 as shown in FIG. 5B. Now the user can change the value by using the backward and forward keys. Once satisfied with a new value, the user can select that to be the preference value by invoking the select key. As shown in FIG. 5C, the selected value is now entered as the preferred setting.

Figure 5D:
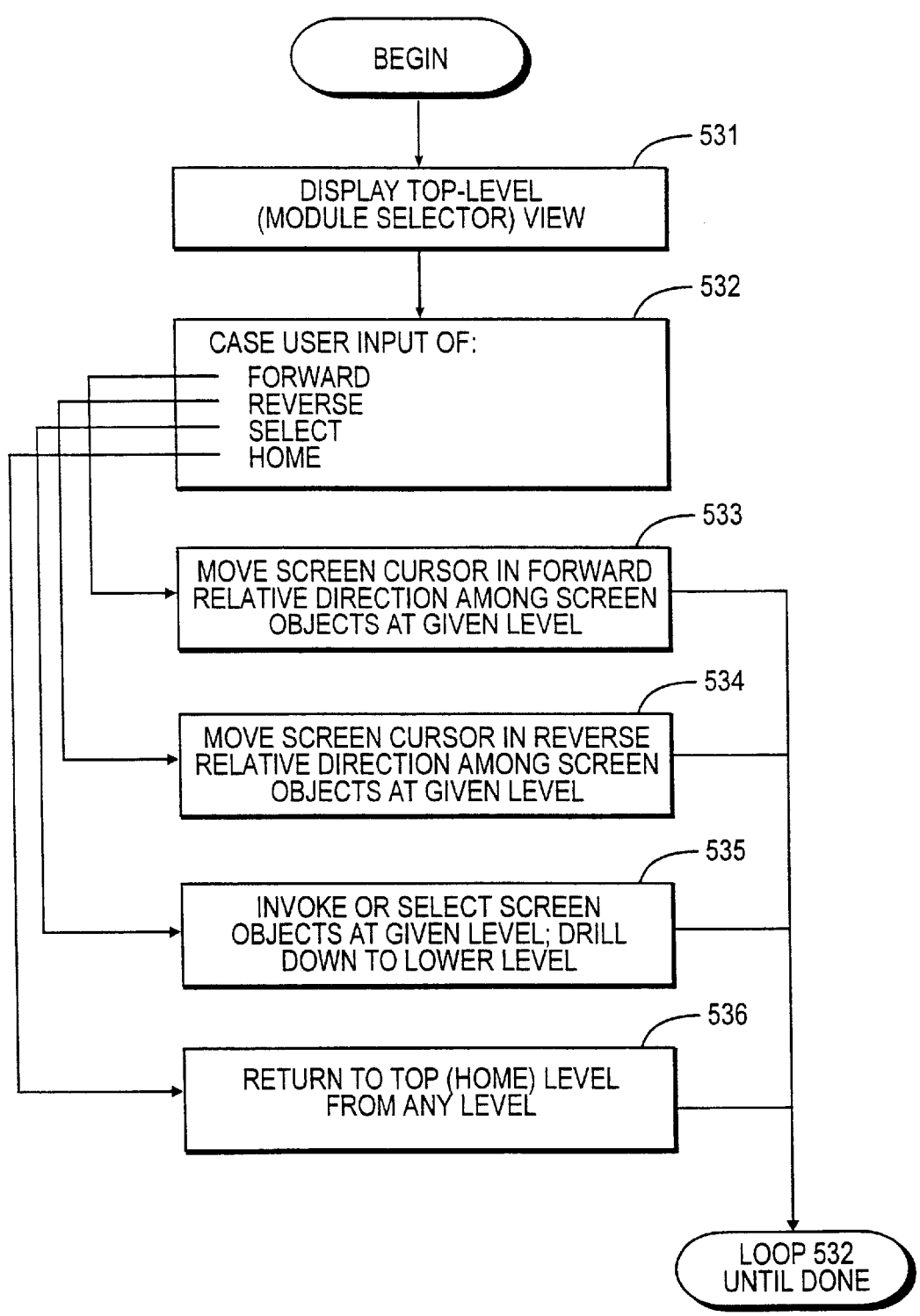
FIG. 5D is a flowchart summarizing internal methodology supporting the navigational model.

A method for providing users with access to applications and user information in a computing device having a limited set of input keys, therefore, may be summarized as shown in FIG. 5D. At the outset, the device displays a user interface having a top level view for allowing a user to select among applications available for the computing device (step 531). User interface navigation is provided in response to user operation of the limited set of input keys (step 532). In response to user selection of a forward key from said limited set of input keys, the device moves a screen cursor in a forward relative direction among screen objects at a given level (step 533). In response to user selection of a reverse key from said limited set of input keys, the device moves the screen cursor in a reverse relative direction among screen objects at a given level (step 534). In response to user selection of a select key from said limited set of input keys, the device selects or invokes a particular screen object at which the screen cursor is currently located (step 535), whereupon the device displays a lower level view of the user interface which pertains to the particular screen object. In response to user selection of a home key from said limited set of input keys, the device returns to the top level view (step 536). The method or process loops or continues for other user input. In this manner, access to the applications and user information is achieved for the computing device through use of said limited set of input keys.

E. Graphical Passwords

Because the device 100 stores potentially sensitive information, a mechanism or "lock" is needed to prevent unauthorized access to that information. In accordance with the present invention, a device having a terse set of input keys implements password protection as follows. The interface implements a "graphical password" which can be entered directly from the terse set of keys. Instead of a conventional alphabetic password as conventionally found on computing devices, the graphical password comprises a sequence of non-alphabetic key strokes from the terse set. Here, an exemplary graphical password might comprise, for example, FORWARD, FORWARD, BACK, BACK, SELECT, or, alternatively, the user could select HOME, SELECT, FORWARD, HOME, HOME, BACK.

Figure 6A:
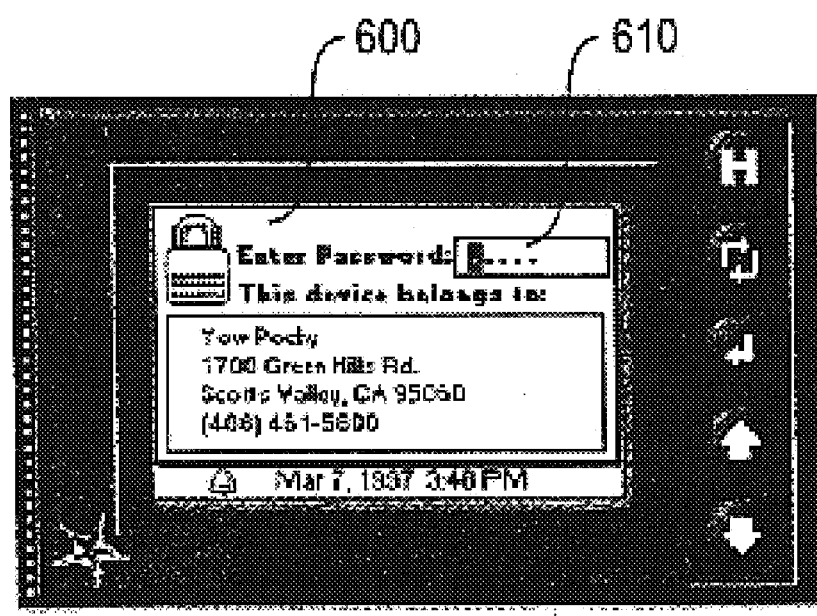
FIG. 6A is a bitmap screen shot illustrating use of "graphical" passwords for controlling user access to the device.

During device operation, upon the user entering a graphical password, the device displays a password entry screen 600, as shown in FIG. 6A. When the device is configured for password protection, the screen appears each time the device is powered up. To gain access to information on the device, the user must at this point enter the same sequence of key strokes as that which comprises the user's graphical password. In an exemplary embodiment, a password mask field 610 indicates entries of each key stroke, but with the actual keys themselves being masked.

Figure 6B:
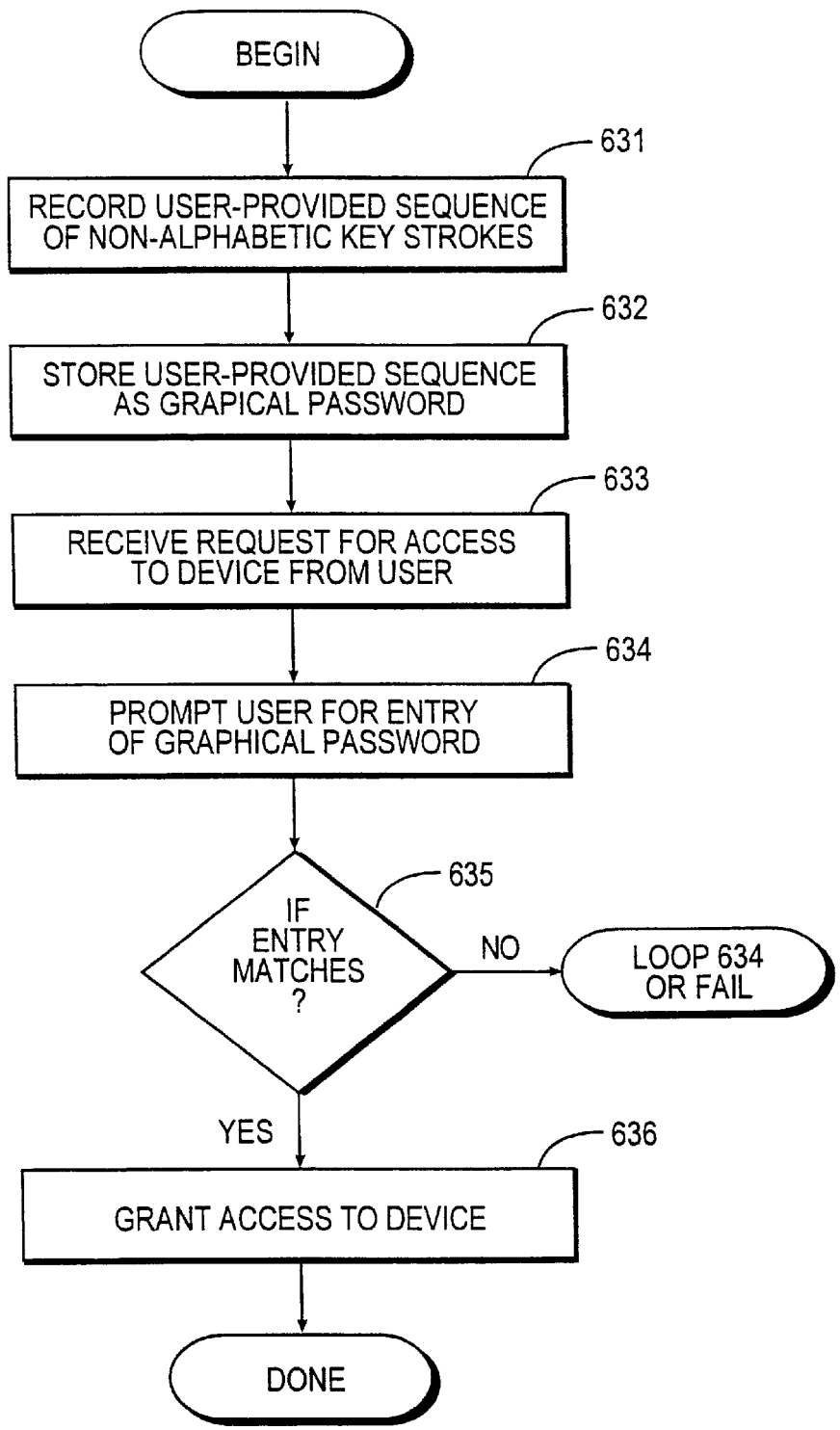
FIG. 6B is a flowchart summarizing internal methodology supporting device access with a graphical password.

A method for controlling access to a computing device having a limited set of input keys (particularly, a set of input keys including non-alphanumeric keys) may, therefore, be summarized as shown in FIG. 6B. At the outset, the device records a user-provided sequence of key strokes entered from the non-alphanumeric keys (step 63 1). The device stores the recorded sequence of key strokes as a "graphical password" (step 632)—that is a password comprising non-alphanumeric key strokes. Upon request from a user for access to the computing device (step 633), the device prompts the user to enter the graphical password (step 634). If the user enters a sequence of key strokes which matches that of the sequence of key strokes stored as the graphical password (step 635), the device grants device access to the user (step 636). Otherwise, the method repeats the prompt (step 634) or fails.

Intelligent Categorization and Navigation of Large Datasets

A. Introduction

Often, a user desires to employ a portable computing device for storing and managing large lists of information, such as an electronic address book. Typically, such information is sorted by a particular key (i.e., indexed by one or more fields). For an address book, for instance, information can be indexed on the key of last name plus first name. Typically, such information is potentially a very large list.

A quick way to navigate to a desired entry in a large list is to perform a search. If one wanted to find an entry in an electronic address book beginning with the letter "S," for instance, the user could quickly search to names beginning with "S" if he or she could easily enter such a letter. For a portable computing device having a terse set of input keys, such as the device 100, the user does not have this option. Given a device with a terse set of input keys or buttons, therefore, a problem arises as to how one efficiently navigates such information efficiently.

Perhaps the simplest approach to navigating a list is to simply proceed through the list in a linear fashion. Such an approach is only workable for small lists, however. Another approach, which is popular with consumer electronic applications, is the "fast repeat" navigation technique. Here, the navigation starts out as a slow, repeating linear search but then increases to a fast-repeating linear search as the user continues to depress the (search) button. With "fast repeat," when the user clicks a button once the value represented by the button (e.g., minutes) advances by 1. If the user holds the button continuously, the value advances faster. With an alarm clock, the user is faced with a sorted list comprising the digits 0 through 9, thus making the "fast repeat" approach at least acceptable. For limited input, therefore, fast repeat is a good approach.

The difficulty with the approach, however, is that the user must still navigate a potentially large list. If something more than simple input is required, such as the input of alphabetic characters, the fast repeat approach becomes unacceptable. For instance, inputting characters from an entire alphabetic character set, including both upper case and lower case characters, the approach is simply not a practical way to input the information into a device. The fast repeat approach is not practical for navigating large datasets, such as an electronic address book containing hundreds of entries.

Given the ability to navigate both across and up/down in the device 100 (using the forward, backward, and select keys), another approach one could employ is to allow a user to navigate across the alphabet to a particular alphabetic character and then navigate down names beginning with the letter represented by that alphabetic character. Although such an approach is an improvement over the fast repeat technique, it still remains impractical for all but the smallest of lists. Therefore, a better approach is needed.

B. Preferred Approach

In accordance with the present invention, list information is organized into discrete categories. To understand this approach, first consider how information is grouped in a Rolodex. There, tabs are provided for individual letters of the alphabet. Adopting that approach electronically, however, is not an optimal approach, as the user would have to navigate or "tab through" a lot of information before reaching the desired target information. In accordance with the present invention, therefore, information is grouped intelligently at runtime (i.e., dynamically) such that a user can rapidly reach a destination or target item without having to tab through a lot of categories which are not of interest. Unlike a Rolodex (electronic or otherwise), the tabs themselves adjust dynamically at runtime to the user's actual data. Specifically, the tabs adjust on-the-fly to correspond to entries in the user's data. In this manner, the system eliminates the need for navigating or tabbing to categories which do not correspond to the actual user data present in the system.

In a preferred embodiment, both a high level approach and a low level approach are adopted. At the high level, the system employs the alphabet (and digits) broken down into sets of three characters, such as "#AB" "CDE," and the like. If no "E" entries are present in the user's date, for instance, the second tab can adjust to "CDF." When combined with the forward/backward navigation keys or buttons, the approach provides an interface allowing the user to quickly navigate among categories. Unlike a Rolodex, however, the categories are simplified based on the user's actual data.

C. Dynamically Adjusting Tab (Category) Interface

Figure 7A:
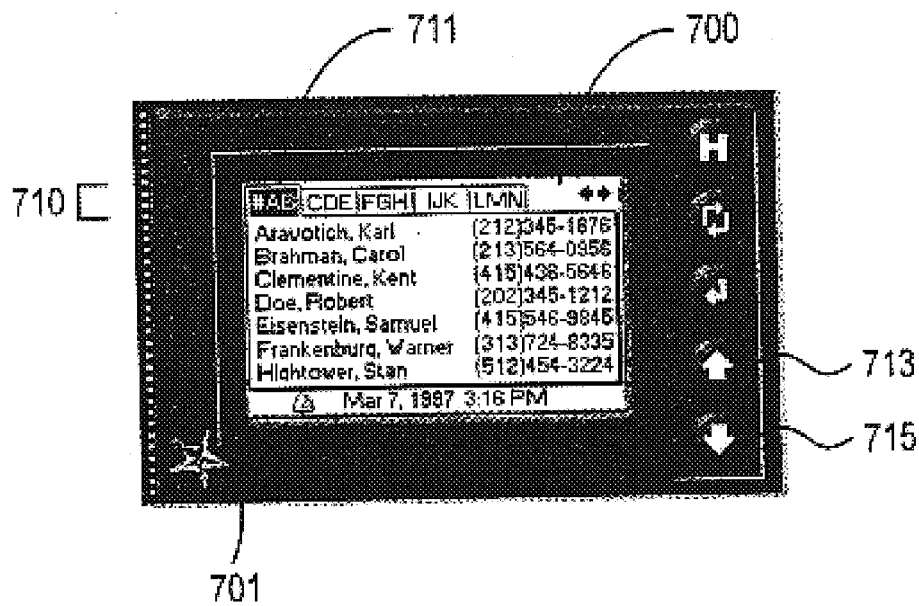
FIGS. 7A–D are bitmap screen shots illustrating use of a dynamically adjusting tab (category) interface for managing a large set of data.

FIGS. 7A–D illustrate an interface which embodies the approach. FIG. 7A illustrates address book interface 700 displaying list information 701. As shown, the interface 700 includes category tabs 710, such as "#AB" tab 711. Since the tab 711 currently has focus, it is highlighted (e.g., displayed in reverse video). To navigate among the categories, the user activates forward (i.e., right or down) and backward (i.e., left or up) keys 715, 713.

Figure 7B:
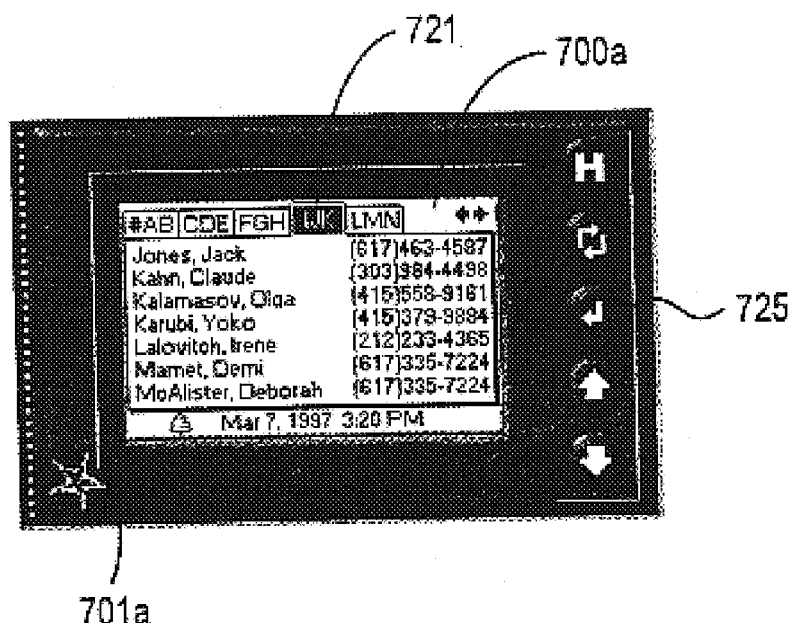

Consider, for instance, the user activity of clicking the forward button or key 715 twice. The result of this action is shown in FIG. 7B. The interface 700 (now 700a) shifts focus to tab 721, as shown. In a corresponding manner, the displayed list 701 (now 701a) is updated, for displaying entries corresponding to the now-selected category (i.e., tab 721). Upon reaching the desired or target category destination, the user can now invoke the select button, shown at 725 in FIG. 7B, for drilling down into the then currently-selected category.

Figure 7C:
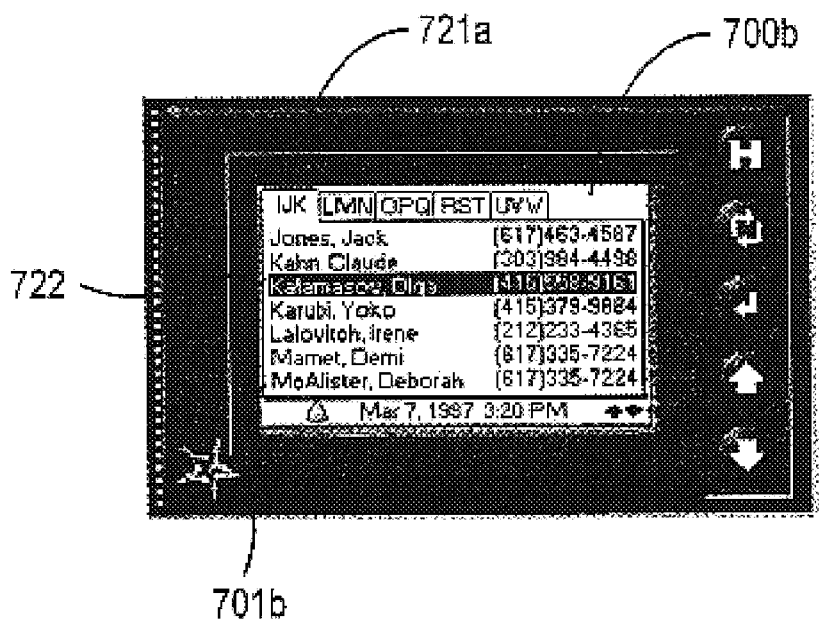
Figure 7D:
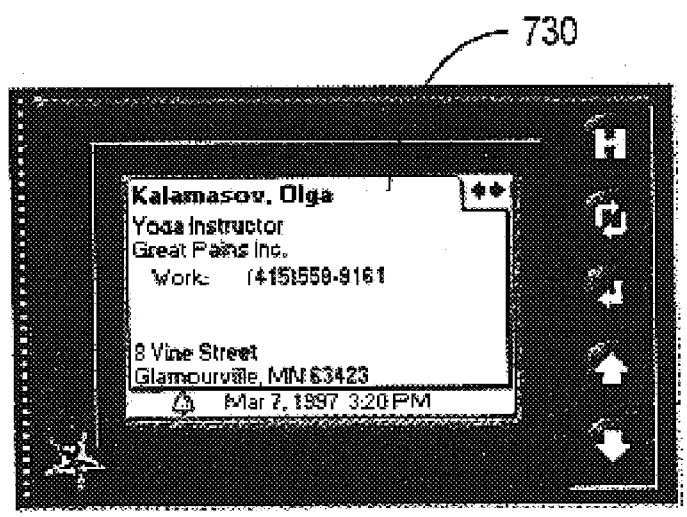

The result of the user action is illustrated in FIG. 7C. Interface 700 (now 700b) displays the tab 721 (now 721a) as the first category. Further, focus has shifted to a particular item on the list 701 (now 701b). Hence, once the user has quickly navigated to the desired category of information, the user can select into that category and proceed to quickly select a particular item from that category. For the example presented in FIGS. 7A–C, the input events can be summarized as follows: across→select→down→select. Upon the final selection of the item of interest, the system displays the information record pertaining to that item. Final selection of item 722, for instance, invokes the display of information record 730, as illustrated in FIG. 7D. At any point during this process, the user can easily return to the top-level view by selecting the "home" key.

Figure 7E:
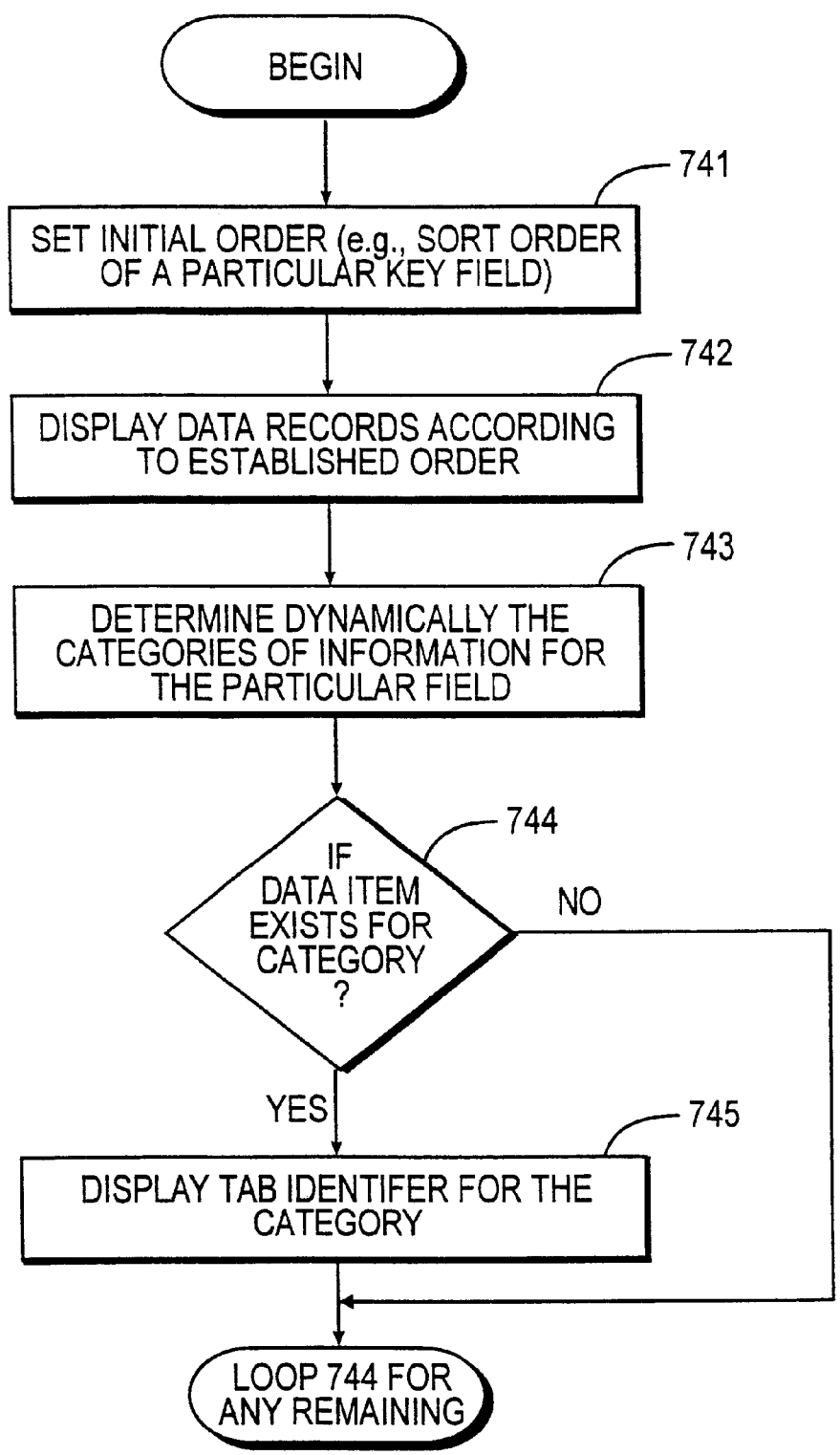
FIG. 7E is a flowchart summarizing internal methodology supporting dynamically adjusting tab categories.

A method for providing access to a data set which stores information in data records having data fields may be summarized as shown in FIG. 7E. An initial order for displaying the data set based on values of a particular data field is established (step 741). Commonly, this will be an alphabetic sort order, such as a descending sort by Last Name. The data set is displayed according to this established order (step 742). To facilitate navigation, the device displays category tabs for navigating among individual data records of the data set. This entails the following. The device determines dynamically, based on actual values stored at the particular data field of the data records, categories of information available for the particular data field (step 743). Based on this determination (tested at step 744), the device displays a tab identifier allowing navigation to a particular category if at least one data item exists for the particular category (step 745). In this manner, at least some tab identifiers are eliminated from display—particularly, tab identifiers are eliminated for those categories of information which currently have no data items. The result is much faster and efficient navigation through large datasets when using a terse or limited key set.

D. Adjusting Dynamically for Subcategories

The foregoing example illustrated a scenario where simple category headings sufficed. At times, however, a simple category heading might not provide sufficient detail.

Figure 8A:
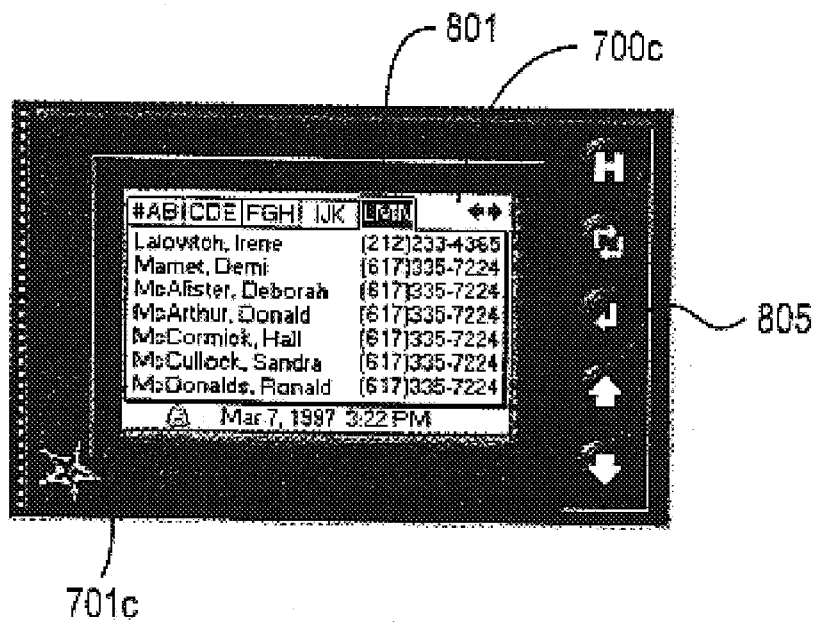
FIGS. 8A–F are bitmap screen shots illustrating the action of tabbing through dynamically-created subcategory tabs.

Consider a scenario when the user has navigated to a category having "M" entries only to find that a very large number of "M" entries exist. In an electronic address book, it is not uncommon to find, for example, a large number of "Mc" entries. FIG. 8A illustrates this scenario. Here, the user has tabbed to a category including "M" entries. For the interface 700 (now 700c), this is shown at tab 801. As a result of having selected tab 801, the list 701 (now 701c) is updated and, for this example, includes a large number of "M" entries. To drill down into these entries, the user clicks the select key, shown at 805.

Figure 8B:
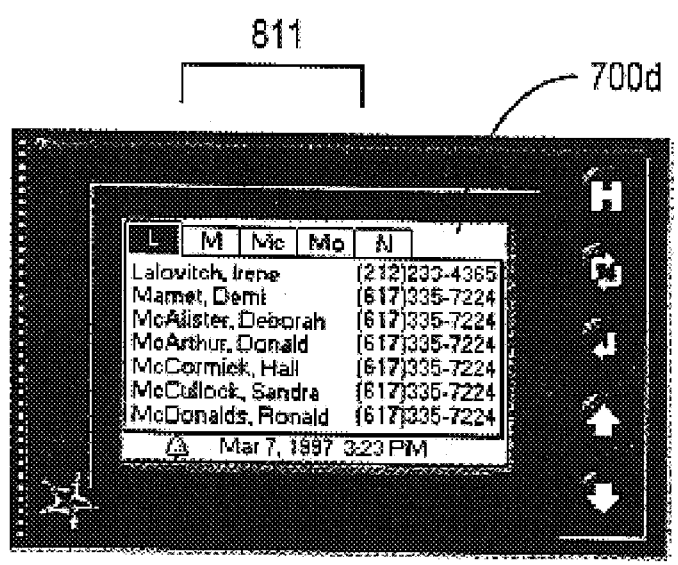

In response to this action, the interface 700 (now 700d) updates, as indicated in FIG. 8B. Note particularly that the category tab has in effect, "split" into subcategory tabs. For instance, "M" entries are now represented by three tabs 811: "M," "Mc," and "Mo" tabs. Here, since there are a great number of "Mc" entries, the system has synthesized dynamically an "Mc" tab, so those entries have their own subcategory tab. In this fashion, the user can quickly navigate to a particular subcategory of interest, thereby avoiding the need to linearly scan through a subcategory having a large number of entries which are not of interest (e.g., "Mc" entries).

Figure 8C:
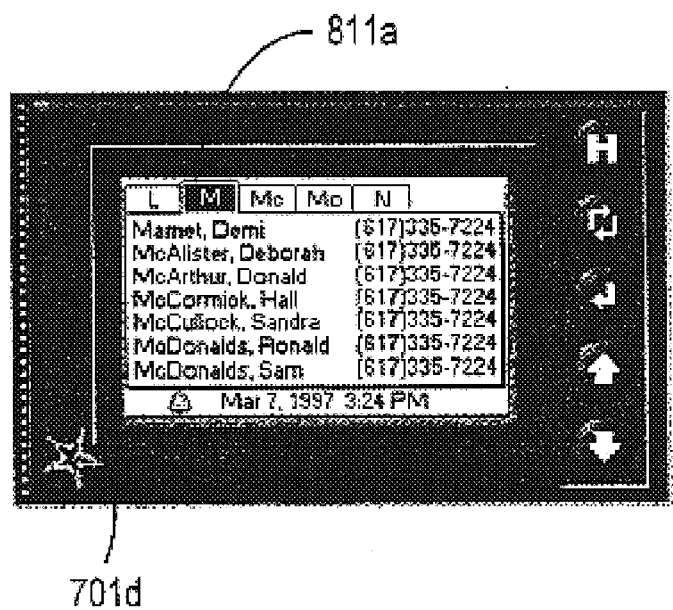
Figure 8D:
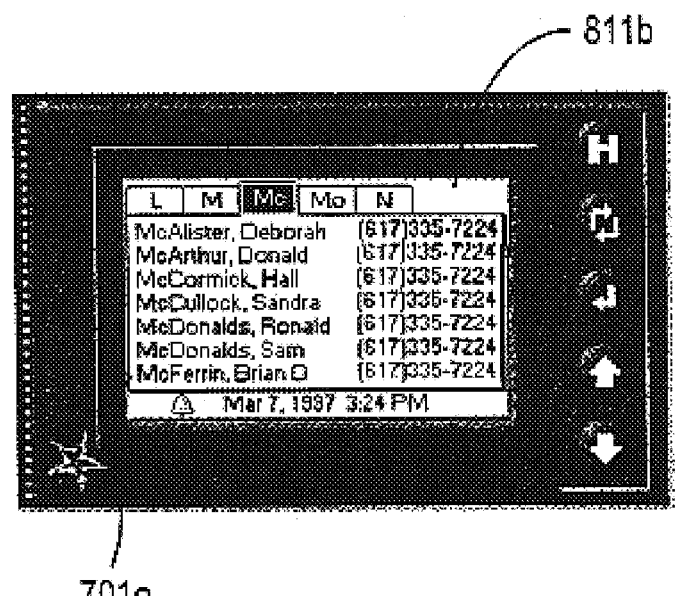
Figure 8E:
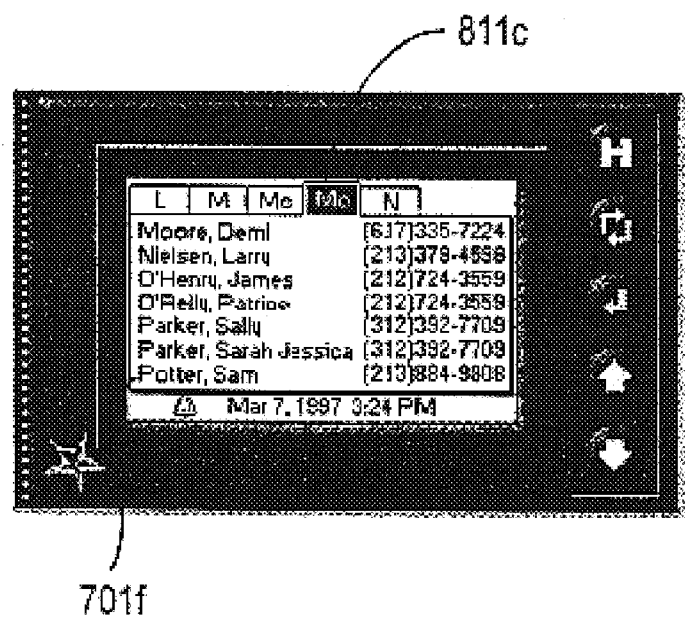
Figure 8F:
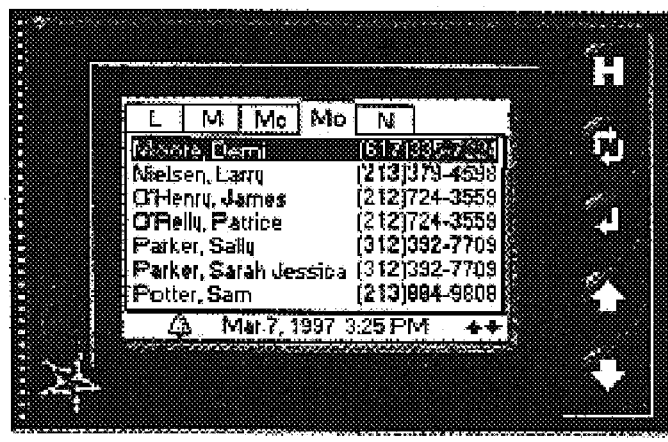

FIGS. 8C–E illustrate the action of the user tabbing through the subcategory tabs 811. As shown in FIG. 8C, upon the user tabbing to subcategory tab 81 1a, the display list 701 (now 701 d) updates to display items corresponding to the newly-selected subcategory tab. In a like manner, the user selecting subcategory tab 811b as shown in FIG. 8D or selecting subcategory tab 811c in FIG. 8E also leads to updating the display list 701, as shown at 701e and 701f, respectively. Upon reaching the subcategory of interest, the user can select into or drill down to a particular item, such as indicated in FIG. 8F. At this point, the user can select the target item of interest using the select key or button. In response, the system displays the corresponding information record (not shown) for that selected item.

E. Screen Threshold

The methodology adopted for dynamically adjusting tab categories and subcategories is, in the preferred embodiment, driven in part by the number of lines supported by the display. In the foregoing example, for instance, the interface supports seven displayable lines which the user can navigate. The number of displayable lines is employed to set a threshold number of items which must exist before creating further tab categories (i.e., subcategories). In the currently-preferred embodiment, the number is set equal to the number of displayable lines plus 1 (e.g., the number 8, for a display having 7 displayable lines). Any three-letter category which qualifies for subcategory tabs is determined by eight or greater items which satisfy that key. For clarity of the interface, the method adopted always creates a boundary tab—that is, a category tab for the starting index after the subcategory set. In the example presented above, the next tab category created is "Mo" (instead of the tab category "N"), even though the number of "Mo" entries might be less than the threshold value. By the same token, the methodology ignores combinations which do not exist in the user data. If no "J" items exist, for example, then a "J" tab is not created. Using the foregoing method, the system provides the user with a "find" operation based, not on a linear search, but on dynamically-created categories. The result is much faster and efficient navigation through large datasets when using a terse key set.

F. Changing Sort Key (Index)

Figure 9A:
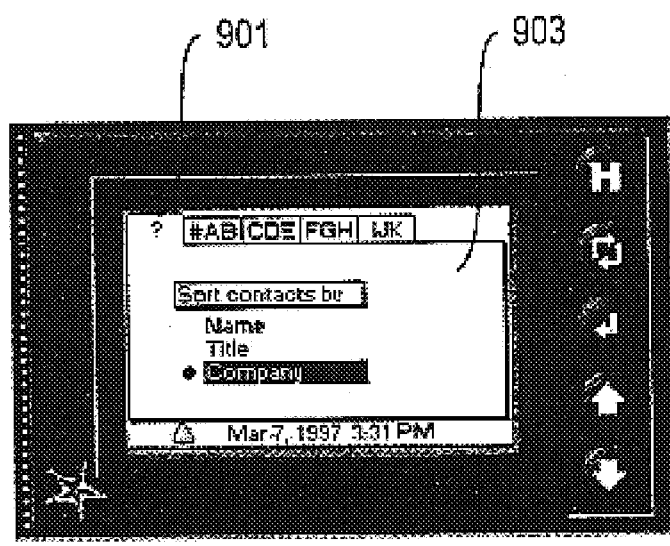
FIGS. 9A–B are bitmap screen shots illustrating a special sort tab, whereupon the tab categories are automatically updated.
Figure 9B:
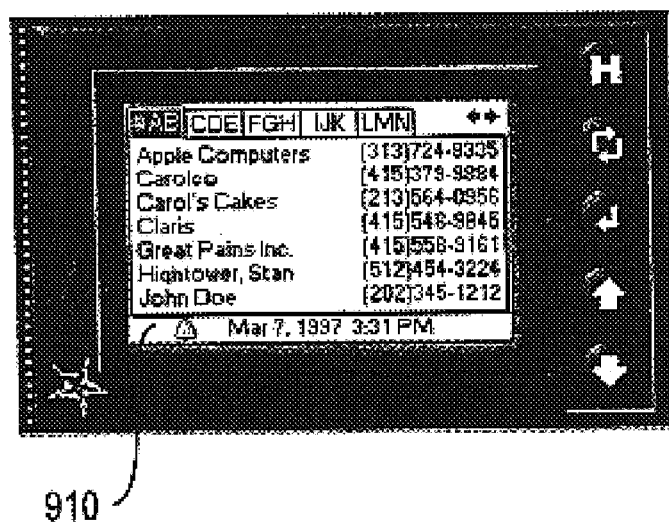

Although the foregoing example illustrates searching based on Last Name, the approach easily accommodates any index or key. As illustrated in FIG. 9A, the interface includes a special sort tab 901. In response to user selection of this tab, the device displays selection screen 903. Here, the user can select another index for presenting the data, such as index by "title" or by "company." As shown in FIG. 9B, at display screen 910, the user data is now sorted by company name. Accordingly, the tab categories are updated. This example demonstrates, the method's operation is generic to a variety of different datasets.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computing device having a set of input keys including non-alphanumeric keys, a method for controlling access to the computing device, the method comprising:

recording a user-provided sequence of non-alphanumeric key strokes from said non-alphanumeric keys;

storing the recorded sequence of non-alphanumeric key strokes as a graphical password, so that said graphical password itself comprises a sequence of non-alphanumeric key strokes from the set of input keys;

upon request from a user for access to the computing device, prompting the user to enter the graphical password; and providing access to the computing device only if the user enters a sequence of key strokes which matches that of the sequence of non-alphanumeric key strokes stored as the graphical password.

2. The method of claim 1, wherein said non-alphanumeric keys include at least one navigational key displaying a directional arrow.

3. The method of claim 2, wherein said at least one navigational key displaying a directional arrow includes a forward key displaying a rightward arrow.

4. The method of claim 2, wherein said at least one navigational key displaying a directional arrow includes a back key displaying a leftward arrow.

5. The method of claim 1, wherein the computing device displays a password mask field for indicating entry of each key stroke, while hiding the actual identity of each such key stroke.

6. The method of claim 1, wherein said recording step includes:

recording a user-provided sequence of keystrokes entered from a keypad comprising a terse set of input keys.

7. The method of claim 1, wherein said recording step includes:

recording a user-provided sequence of keystrokes entered from a keypad comprising a set of at least four input keys.

8. The method of claim 1, wherein said recording step includes:

recording a user-provided sequence of keystrokes entered from a keypad comprising a set of no more than five input keys.

9. The method of claim 1, wherein said recording step includes:

recording a user-provided sequence of keystrokes entered from a keypad comprising navigation keys.

10. The method of claim 1, wherein said prompting step includes:

displaying a password entry screen for facilitating password entry by a user.

11. The method of claim 10, further comprising:

displaying the password entry screen when the computing device is first powered up.

12. The method of claim 10, wherein whether the password entry screen is display when the device is first powered up is configurable by a user.

13. The method of claim 1, wherein access to information on the device is blocked when the user enters a sequence of key strokes that does not match that of the sequence of non-alphanumeric key strokes stored as the graphical password.

14. The method of claim 1, wherein said stored graphical password comprises information indicating a particular sequence of non-alphanumeric key strokes.

15. In a computing device capable of receiving user input, a method for securing information stored on the computing device, the method comprising:

receiving a particular sequence of user input, of non-alphanumeric key strokes from non-alphanumeric keys;

storing said particular sequence of user input as a graphical password for controlling access to said information on the computing device, so that said graphical password itself comprises a sequence of key strokes from said non-alphanumeric keys;

upon an attempt to access said information on the computing device, requiring subsequent input of a sequence of user input;

attempting to verify the sequence of user input subsequently inputted based on the particular sequence of user input previously stored as said graphical password; and providing access to said information on the computing device if the sequence of user input subsequently inputted is verified.

16. The method of claim 15, wherein said key strokes of non-alphanumeric keys include input of at least one navigational keystroke.

17. The method of claim 16, wherein said at least one navigational key displays a directional arrow.

18. The method of claim 17, wherein at least one navigational key displaying a directional arrow includes a forward key displaying a rightward arrow.

19. The method of claim 17, wherein said at least one navigational key displaying a directional arrow includes a back key displaying a leftward arrow.

20. The method of claim 15, wherein the computing device displays a password field for facilitating input of said particular sequence of user input.

21. The method of claim 20, wherein said password field masks the particular sequence of user input from display.

22. The method of claim 25, wherein said receiving step includes:

receiving a user-provided sequence of keystrokes entered from a keypad comprising a terse set of input keys.

23. The method of claim 15, wherein said receiving step includes:

receiving a user-provided sequence of keystrokes entered from a keypad comprising a set of at least four input keys.

24. The method of claim 15, wherein said receiving step includes:

receiving a user-provided sequence of keystrokes entered from a keypad comprising a set of no more than five input keys.

25. The method of claim 15, wherein said receiving step includes:

receiving a user-provided sequence of keystrokes entered from a keypad comprising navigation keys.

26. The method of claim 15, wherein said requiring step includes:

displaying a password entry screen requiring password entry by a user.

27. The method of claim 26, further comprising:

displaying the password entry screen when the computing device is first powered up.

28. The method of claim 26, wherein whether the password entry screen is display when the device is first powered up is configurable by a user.

29. The method of claim 15, wherein access to information on the device is blocked when the user enters a sequence of input that does not match that of the stored sequence of input.

30. The method of claim 15, wherein said stored sequence of input comprises a graphical password having information indicating a particular sequence having at least some key strokes of the non-alphanumeric keys.

31. An electronic device providing secured access to information stored on the device comprising:

a keypad allowing a user to enter a sequence of non-alphanumeric key stokes;

a memory for storing a particular sequence of user key strokes for controlling access to said information on the device, said particular sequence of user key strokes comprising a graphical password including at least some non-alphanumeric key strokes that is stored in said memory; and program logic requiring subsequent input of an identical sequence of user key strokes that matches said graphical password in order to gain access to said information on the device.

32. The device of claim 31, wherein said keypad is a terse keypad.

33. The device of claim 31, wherein said keypad comprises at least four and no more than five input keys.

34. The device of claim 31, wherein said keypad includes at least one navigational key.

35. The device of claim 34, wherein said at least one navigational key displays a directional arrow.

36. The device of claim 35, wherein said at least one navigational key displaying a directional arrow includes a forward key displaying a rightward arrow.

37. The device of claim 35, wherein said at least one navigational key displaying a directional arrow includes a back key displaying a leftward arrow.

38. The device of claim 34, wherein said device includes a display screen for presenting a password field for facilitating input of said particular sequence of user key strokes.

39. The device of claim 38, wherein said password field masks the particular sequence of user key strokes from display.

40. The device of claim 34, wherein said keypad comprises keys for navigating a graphical user interface.

41. The device of claim 34, wherein said device includes a display screen for displaying a password entry screen requiring password entry by a user seeking access to the information on the device.

42. The system of claim 34, wherein said password entry screen is displayed when the computing device is first powered up.

* * * * *